(12) United States Patent
Sugahara

(10) Patent No.: US 7,896,486 B2
(45) Date of Patent: Mar. 1, 2011

(54) PRINTING APPARATUS

(75) Inventor: Hiroto Sugahara, Aichi-ken (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 747 days.

(21) Appl. No.: 11/904,755

(22) Filed: Sep. 27, 2007

(65) Prior Publication Data

US 2008/0074484 A1 Mar. 27, 2008

(30) Foreign Application Priority Data

Sep. 27, 2006 (JP) ................................. 2006-262782

(51) Int. Cl.
*B41J 2/01* (2006.01)
(52) U.S. Cl. ....................................................... 347/102
(58) Field of Classification Search ........................ None
See application file for complete search history.

(56) References Cited

U.S. PATENT DOCUMENTS

| | | | |
|---|---|---|---|
| 6,766,817 B2 | 7/2004 | da Silva | |
| 6,783,227 B2 | 8/2004 | Suzuki et al. | |
| 6,918,404 B2 | 7/2005 | Dias da Silva | |
| 7,066,586 B2 | 6/2006 | da Silva | |
| 2004/0227783 A1* | 11/2004 | Kumamoto et al. | 347/22 |
| 2005/0012778 A1* | 1/2005 | Nishino et al. | 347/29 |
| 2006/0007290 A1 | 1/2006 | Oshima et al. | |

FOREIGN PATENT DOCUMENTS

| | | |
|---|---|---|
| JP | 2004314304 | 11/2004 |
| JP | 2004358753 | 12/2004 |
| JP | 2005104108 | 4/2005 |

* cited by examiner

*Primary Examiner* — Manish S Shah
*Assistant Examiner* — Alexander C Witkowski
(74) *Attorney, Agent, or Firm* — Frommer Lawrence & Haug LLP

(57) ABSTRACT

A printing apparatus includes an ink-jet head which has a nozzle surface opened with a plurality of nozzle holes for discharging the UV-curable ink curable by ultraviolet light, toward a recording medium; a UV light source unit which is provided integrally with the ink-jet head and which irradiates the ultraviolet light toward the recording medium; a wiper which wipes the nozzle surface of the ink-jet head; and an ink-absorbing member provided between the ink-jet head and the UV light source unit. Since the UV-curable ink, which is wiped by the wiper, is absorbed by the ink-absorbing member, it is possible to prevent the light-outgoing surface of the UV light source unit from any adhesion of the UV-curable ink. Accordingly, the ultraviolet light can be uniformly irradiated from the UV light source unit, and it is possible to improve the printing quality with the UV-curable ink.

16 Claims, 10 Drawing Sheets

SCANNING DIRECTION

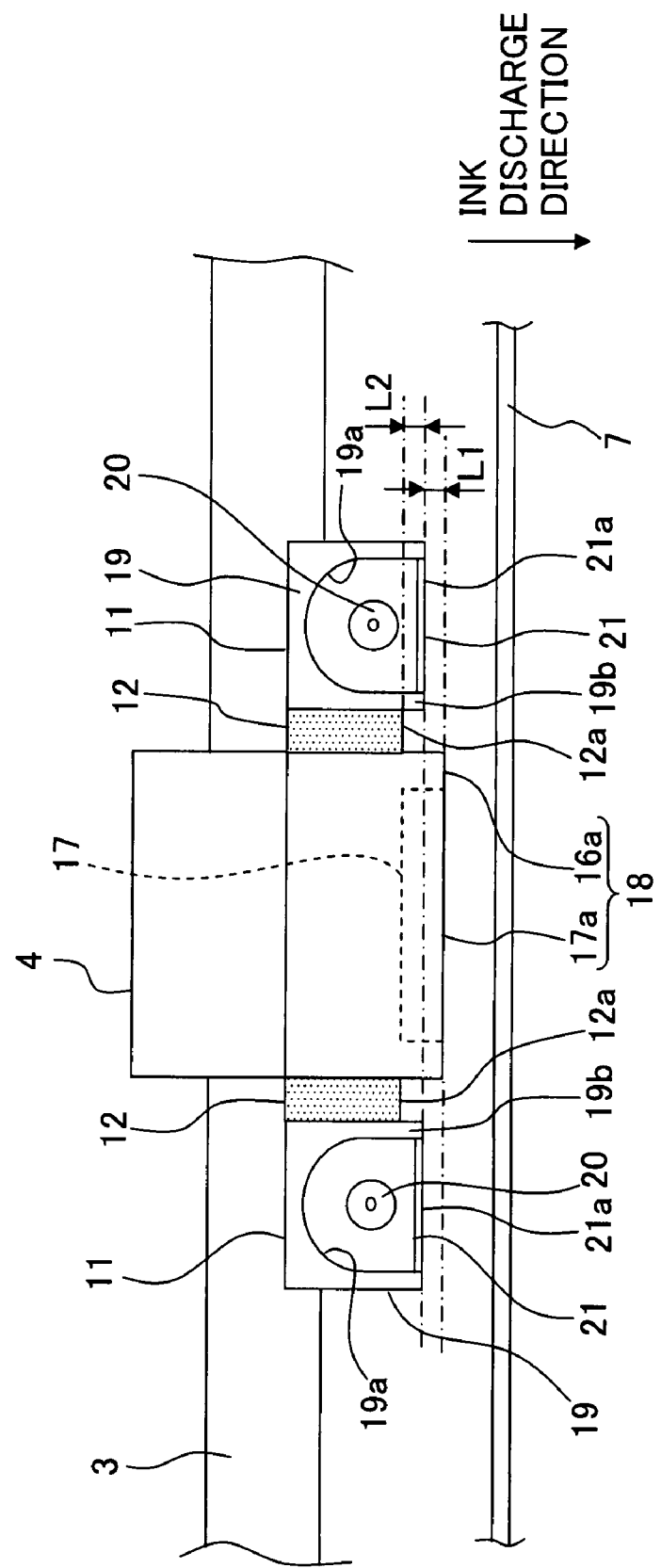

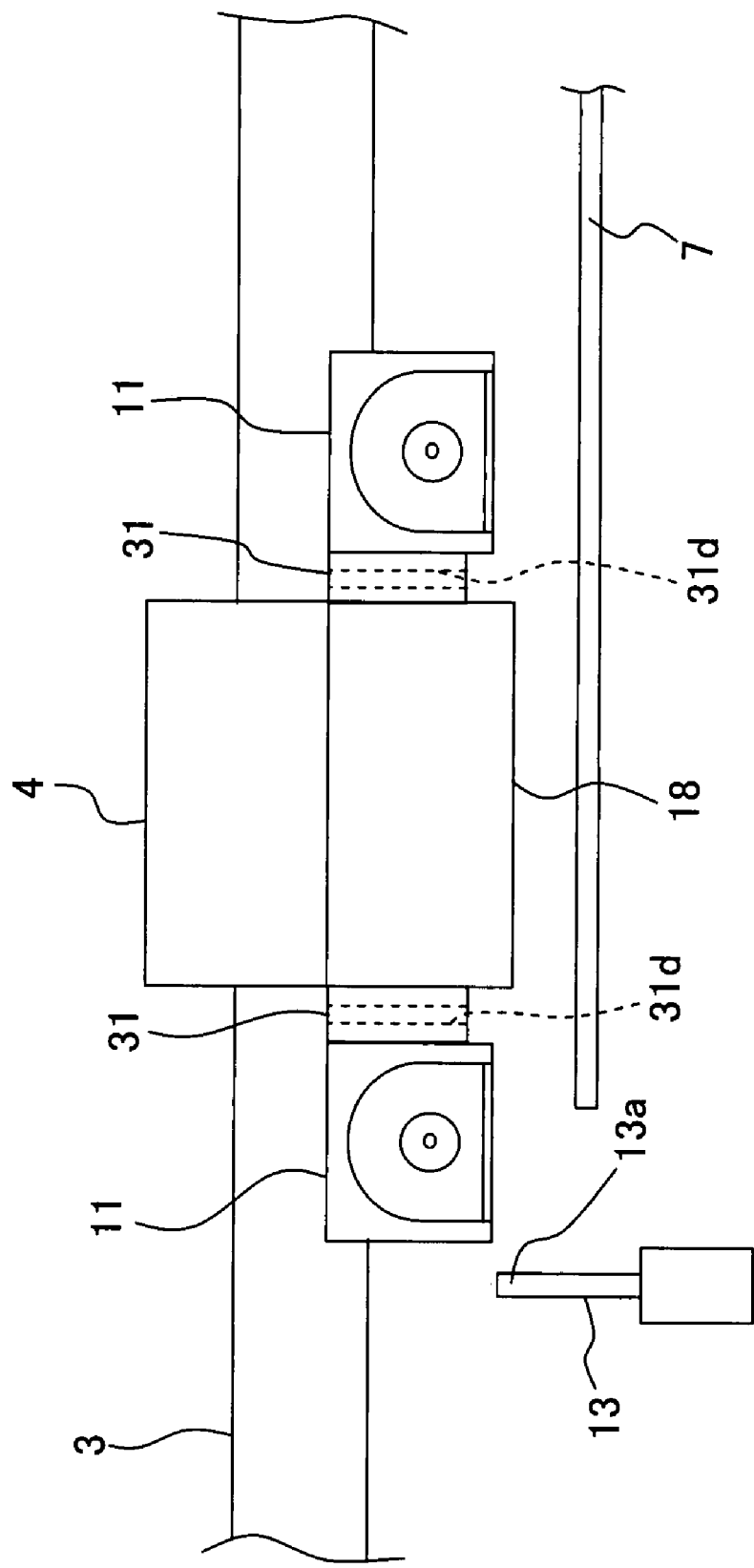

PRINTING APPARATUS

CROSS REFERENCE TO RELATED APPLICATION

The present application claims priority from Japanese Patent Application No. 2006-262782, filed on Sep. 27, 2006, the disclosure of which is incorporated herein by reference in its entirety.

BACKGROUND OF THE INVENTION

1. Field of the Invention

The present invention relates to a printing apparatus which performs printing with a UV-curable ink curable by the ultraviolet light.

2. Description of the Related Art

In recent years, an ink-jet printer, which uses a UV-curable ink that is curable by the ultraviolet light, has been suggested. For example, in the case of an ink-jet printer disclosed in U.S. Pat. No. 6,783,227 (corresponding to Japanese Patent Application Laid-open No. 2004-314304), the UV-curable ink is discharged from an ink-jet head toward a recording objective member, the ultraviolet light is irradiated from a UV light source disposed adjacently to the ink-jet head toward ink droplets landed on the recording objective member, and thus the UV-curable ink is cured and secured onto the recording objective member. When the UV-curable ink is used as described above, the following advantage is obtained. That is, the printing can be also performed, for example, on the resin and the metal other than the paper, and the water resistance is satisfactory as well. A printed matter having glossiness is obtained.

From another viewpoint, in the case of the ink-jet printer, when the ink is adhered to the nozzle surface of the ink-jet head, then the nozzles are clogged, and pixels, on which any ink is not adhered, appear on the recording medium. Accordingly, the image quality is deteriorated in some cases. In view of the above, an ink-jet printer has been already provided, which is provided with a wiper mechanism which wipes the ink adhered to the nozzle surface of the ink-jet head. The operation of the wiper mechanism is, for example, as follows. That is, in a certain type thereof, a wiper member is moved in parallel to the ink-jet head which is stopped so that the nozzle surface is wiped. In another type thereof, a wiper, which stands still, protrudes when the ink-jet head is moved so that the nozzle surface is wiped.

However, if any wiper mechanism is introduced into the ink-jet printer described in U.S. Pat. No. 6,783,227, after the wiper is separated from the end of the nozzle surface, the wiper is positioned in the vicinity of the UV light source disposed adjacently to the ink-jet head. Therefore, it is feared that the UV-curable ink may be adhered to the light-outgoing surface of the UV light source. In this situation, when the ultraviolet light is irradiated from the UV light source after the completion of the wiping operation, the UV-curable ink, which is adhered to the light-outgoing surface of the UV light source, is immediately cured. Therefore, the ultraviolet light cannot be irradiated uniformly from the UV light source, and the printing quality is deteriorated.

SUMMARY OF THE INVENTION

The present invention has been made taking the foregoing circumstances into consideration, an object of which is to improve the printing quality of a printing apparatus which uses a UV-curable ink.

According to a first aspect of the present invention, there is provided a printing apparatus which performs printing with a UV-curable ink curable by ultraviolet light; the printing apparatus including an ink-jet head which has a nozzle surface on which a plurality of nozzle holes are open, the nozzle holes discharging the UV-curable ink toward a recording medium; a UV light source unit which is provided integrally with the ink-jet head and which irradiates the ultraviolet light toward the recording medium; a wiper which wipes the nozzle surface of the ink-jet head; and an ink-absorbing member which is provided between the ink-jet head and the UV light source unit.

According to the printing apparatus of the present invention, the wiper wipes the nozzle surface to arrive at the end of the ink-jet head, and then the UV-curable ink, which is wiped by the wiper, is absorbed by the ink-absorbing member disposed adjacently to the ink-jet head. Therefore, the light-outgoing surface of the UV light source unit can be prevented from any adhesion of the UV-curable ink. Therefore, the ultraviolet light can be irradiated uniformly from the UV light source unit. It is possible to improve the printing quality with the UV-curable ink.

In the printing apparatus of the present invention, at least a side wall, of the UV light source unit, on a side of the ink-absorbing member, may protrude in a discharge direction of the UV-curable ink more than the ink-absorbing member. In this arrangement, the ultraviolet light, which comes from the UV light source unit, is shielded by the side wall of the UV light source unit. Therefore, the ink-absorbing member is prevented from being irradiated with the ultraviolet light. Therefore, the UV-curable ink, which is absorbed by the ink-absorbing member, is prevented from being cured. It is possible to suppress the deterioration of the ink-absorbing function of the ink-absorbing member.

In the printing apparatus of the present invention, the side wall may be a part of a casing of the UV light source unit. In this arrangement, it is unnecessary to distinctly provide any member for shielding the ink-absorbing member from the irradiation of the ultraviolet light irradiated from the UV light source unit. Therefore, it is possible to suppress the increase in the number of parts.

In the printing apparatus of the present invention, the side wall may be a light shielding plate which is provided as a separate member from a casing of the UV light source unit. In this arrangement, the light shielding plate is provided as the member distinct from the casing. Therefore, the arrangement of the light shielding plate can be changed irrelevant to the position of the light-outgoing surface of the UV light source unit. It is easy to adjust the shielding range.

In the printing apparatus of the present invention, the side wall may protrude in the discharge direction of the UV-curable ink more than a light-outgoing surface of the UV light source unit. In this arrangement, the ultraviolet light, which is irradiated from the UV light source unit, is reliably shielded by the light shielding plate. Therefore, the ink-absorbing member is prevented from being irradiated with the ultraviolet light. Therefore, it is also possible to arrange the light-outgoing surface of the UV light source unit separately from the recording medium. It is possible to widen the ultraviolet light irradiation range.

In the printing apparatus of the present invention, the nozzle surface of the ink-jet head may protrude in a discharge direction of the UV-curable ink more than a light-outgoing surface of the UV light source unit. In this arrangement, the wiper, which wipes the nozzle surface of the ink-jet head, is prevented from making contact with the light-outgoing surface of the UV light source unit. Therefore, the light-outgoing surface of the UV light source unit can be prevented from any adhesion of the UV-curable ink which is wiped by the wiper.

In the printing apparatus of the present invention, the nozzle surface of the ink-jet head may protrude in a discharge direction of the UV-curable ink more than the ink-absorbing member. In this arrangement, the wiper can reliably perform the wiping from the end of the ink-jet head without being disturbed by the ink-absorbing member. Therefore, the UV-curable ink, which is adhered to the entire nozzle surface, can be effectively removed.

In the printing apparatus of the present invention, a projection and a recess may be formed in an area on a side surface, of the ink-jet head, on a side of the ink-absorbing member, the area ranging from the nozzle surface to the ink-absorbing member. In this arrangement, when the wiper wipes the nozzle surface of the ink-jet head to arrive at the end of the nozzle surface, the liquid drops of the UV-curable ink adhered to the forward end of the wiper make contact with the projection and recess of the side surface of the ink-jet head. Accordingly, the UV-curable ink is spread on the side surface of the ink-jet head by the surface tension. Therefore, the liquid drops of the UV-curable ink wiped by the wiper are prevented from growing and falling. The UV-curable ink can be reliably absorbed by the ink-absorbing member along with the side surface of the ink-jet head.

In the printing apparatus of the present invention, the projection and recess may be defined by a guide groove formed on the side surface, the groove ranging from the nozzle surface to the ink-absorbing member. In this arrangement, the liquid drops of the UV-curable ink, which arrive at the end of the nozzle surface by the wiping, are spread so that the liquid drops are guided to the ink-absorbing member along the guide grooves by the surface tension. Therefore, the UV-curable ink, which is wiped by the wiper, can be quickly absorbed by the ink-absorbing member.

In the printing apparatus of the present invention, the projection and recess may be formed to have a rough surface shape or in a wrinkle shape. In this arrangement, the liquid drops of the UV-curable ink, which arrive at the end of the nozzle surface by the wiping, are spread on the side surface of the ink-jet head by the surface tension. Therefore, the UV-curable ink, which is wiped by the wiper, is easily absorbed by the ink-absorbing member along with the side surface of the ink-jet head.

According to a second aspect of the present invention, there is provided a printing apparatus which performs printing with a UV-curable ink curable by ultraviolet light; the printing apparatus including an ink-jet head which has a nozzle surface on which a plurality of nozzle holes are formed, the nozzle holes discharging the UV-curable ink toward a recording medium; a UV light source unit which has a light-outgoing surface via which the ultraviolet light is irradiated toward the recording medium and which is provided integrally with the ink-jet head; a wiper which wipes the nozzle surface by moving relative to the ink-jet head; and an ink-receiving portion which is formed between the ink-jet head and the UV light source unit and which receives the ink wiped by the wiper; wherein the light-outgoing surface is positioned to bring the wiper into contact with the nozzle surface and to prevent the wiper from making contact with the light-outgoing surface when the ink-jet head moves relative to the wiper.

According to the printing apparatus of the present invention, the UV-curable ink, which is wiped by the wiper, is received by the ink-receiving portion disposed adjacently to the ink-jet head, and the wiper makes no contact with the light-outgoing surface. Therefore, the light-outgoing surface of the UV light source unit can be prevented from the adhesion of the UV-curable ink. Therefore, the ultraviolet light can be irradiated uniformly from the UV light source unit. It is possible to improve the printing quality with the UV-curable ink.

In the printing apparatus of the present invention, the ink-receiving section may be formed of an ink-absorbing member. In this arrangement, the UV-curable ink, which is wiped by the wiper, is absorbed by the ink-absorbing member. Therefore, the light-outgoing surface of the UV light source unit can be prevented from the adhesion of the UV-curable ink. Therefore, the ultraviolet light can be irradiated uniformly from the UV light source unit. It is possible to improve the printing quality with the UV-curable ink.

In the printing apparatus of the present invention, the light-outgoing surface may protrude more than the ink-absorbing member in a discharge direction of the UV-curable ink. In this arrangement, the ink-absorbing member is prevented from being irradiated with the ultraviolet light irradiated from the UV light source unit. Therefore, the UV-curable ink, which is absorbed by the ink-absorbing member, is prevented from being cured. It is possible to suppress the deterioration of the ink-absorbing function of the ink-absorbing member.

In the printing apparatus of the present invention, the UV light source unit may have a side wall, on a side of the ink-absorbing member, the side wall extending in a discharge direction of the UV-curable ink; and a forward end of the side wall may protrude more than the ink-absorbing member in the discharge direction of the UV-curable ink. In this arrangement, the ultraviolet light, which is irradiated from the UV light source unit, is shielded by the side wall of the UV light source unit. Therefore, the ink-absorbing member is prevented from being irradiated with the ultraviolet light. Therefore, the UV-curable ink, which is absorbed by the ink-absorbing member, is prevented from being cured. It is possible to suppress the deterioration of the ink-absorbing function of the ink-absorbing member.

In the printing apparatus of the present invention, the ink-receiving section may be a groove. In this arrangement, the UV-curable ink, which is wiped by the wiper, falls into the groove. Therefore, the light-outgoing surface of the UV light source unit can be prevented from the adhesion of the UV-curable ink. Accordingly, the ultraviolet light can be irradiated uniformly from the UV light source unit. It is possible to improve the printing quality with the UV-curable ink.

In the printing apparatus of the present invention, the UV light source unit may have a side wall which extends in a discharge direction of the UV-curable ink and which forms a part disposed on a side of the groove. In this arrangement, the ultraviolet light irradiated from the UV light source unit is shielded by the side wall of the UV light source unit. Therefore, the groove is prevented from any malfunction as the ink-receiving section, which would be otherwise caused such that the UV-curable ink pooled in the groove is cured.

BRIEF DESCRIPTION OF THE DRAWINGS

FIG. 3 shows a front view illustrating main components of the printing apparatus shown in FIG. 1.

FIG. 5 shows a front view illustrating main components of a printing apparatus according to a second embodiment of the present invention.

DESCRIPTION OF THE PREFERRED EMBODIMENTS

Embodiments according to the present invention will be explained below with reference to the drawings.

Figure 1:
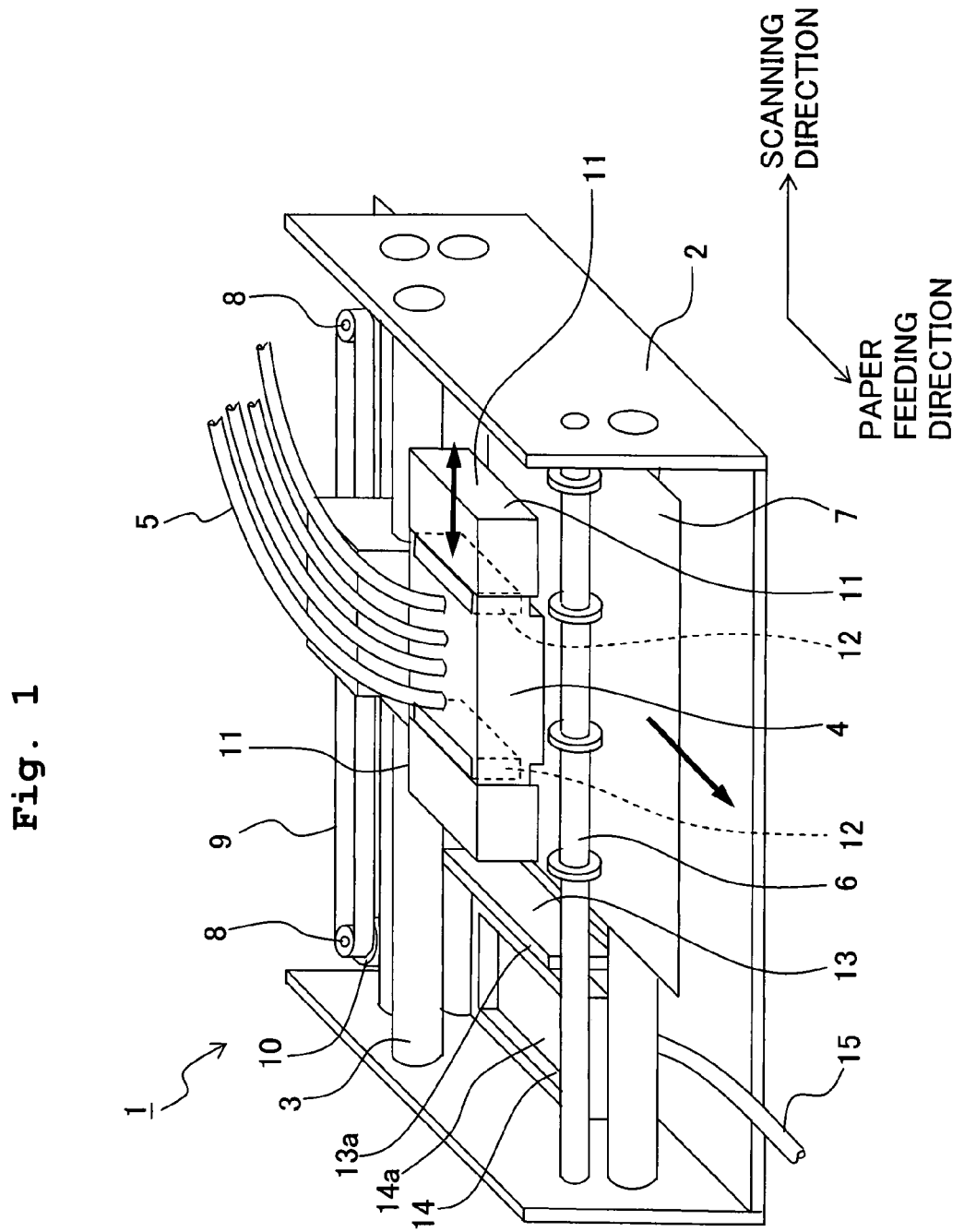
FIG. 1 shows a perspective view illustrating a printing apparatus according to a first embodiment of the present invention.

FIG. 1 shows a perspective view illustrating a printing apparatus 1 according to a first embodiment of the present invention. As shown in FIG. 1, the printing apparatus 1 has a guide rod 3 which spans a casing 2. An ink-jet head 4 is supported slidably by the guide rod 3. One end of an ink supply tube 5 is connected to the ink-jet head 4. A UV-curable ink is supplied from an ink tank (not shown). The UV-curable ink is composed of a photopolymerizable resin, a photopolymerization initiator, and a coloring agent. Those usable as the photopolymerizable resin include resins based on, for example, acrylate and methacrylate. Those usable as the photopolymerization initiator include resins based on, for example, benzophenone, benzoin, acetophenone, and thioxanthone. Those usable as the coloring agent include pigments. A nozzle surface 18 (see FIG. 2) is provided on the lower surface of the ink-jet head 4. A recording medium 7 (for example, a paper sheet) is transported by a paper feed roller 6 through an ink discharge area disposed under the nozzle surface 18 (in the following description, the term "paper feeding direction" means the direction in which the recording medium 7 is transported). The ink-jet head 4 is joined to a timing belt 9 which is wound around a pair of pulleys 8. The timing belt 9 is arranged in parallel to the axial direction of the guide rod 3. A motor 10, which is to be driven and rotated in the positive and negative directions, is provided for one pulley 8. When the pulley 8 is driven and rotated in the positive and negative directions, then the timing belt 9 makes the reciprocating movement, and the ink-jet head 4 is moved along the guide rod 3. That is, the ink-jet head 4 is moved by the guide rod 3, the pulleys 8, the timing belt 9, and the motor 10 (in the following description, the term "scanning direction" means the movement direction of the ink-jet head 4).

UV light source units 11 are attached integrally with the ink-jet head 4 on the both sides of the ink-jet head 4 in the scanning direction respectively. Light-outgoing surfaces 21a (see FIGS. 2 and 3) are provided on the lower surfaces of the UV light source units 11. The ultraviolet light is irradiated toward the recording medium 7 which is transported by the transport roller 6 under the light-outgoing surfaces 21a. The wavelength band to cure the UV-curable ink is about 250 to 420 nm. Therefore, those usable as the UV light source include, for example, a metal halide lamp having a peak at a wavelength of, for example, 310 nm or 380 nm, a high pressure mercury ultraviolet lamp having a peak at a wavelength of, for example, 365 nm, and an ultraviolet LED having a peak at a wavelength of, for example, 365 nm. Rectangular parallelepiped-shaped ink-absorbing members 12, each of which is composed of a porous member such as sponge or urethane, are installed as ink-receiving portions between the ink-jet head 4 and the UV light source units 11. A wiper 13, which is composed of an elastic plate, is provided to stand from the bottom wall of the casing 2 on one side of the ink-jet head 4 in the scanning direction while being deviated from the transport passage for the recording medium 7. That is, when the ink-jet head 4 is moved to one side while exceeding the transport passage for the recording medium 7, the upper end 13a of the wiper 13 wipes the nozzle surface 18 of the ink-jet head 4. A purge cap 14, which has a recess 14a for enclosing the nozzle surface 18 of the ink-jet head 4 when the printing apparatus 1 does not perform the printing, is provided on one side of the wiper 13. The purge cap 14 is movable upwardly and downwardly between the position to make contact with the nozzle surface 18 and the position separated from the nozzle surface 18. A purge tube 15 is connected to the purge cap 14 in order to transmit the suction pressure from a pump (not shown) to the recess 14a.

Figure 2:
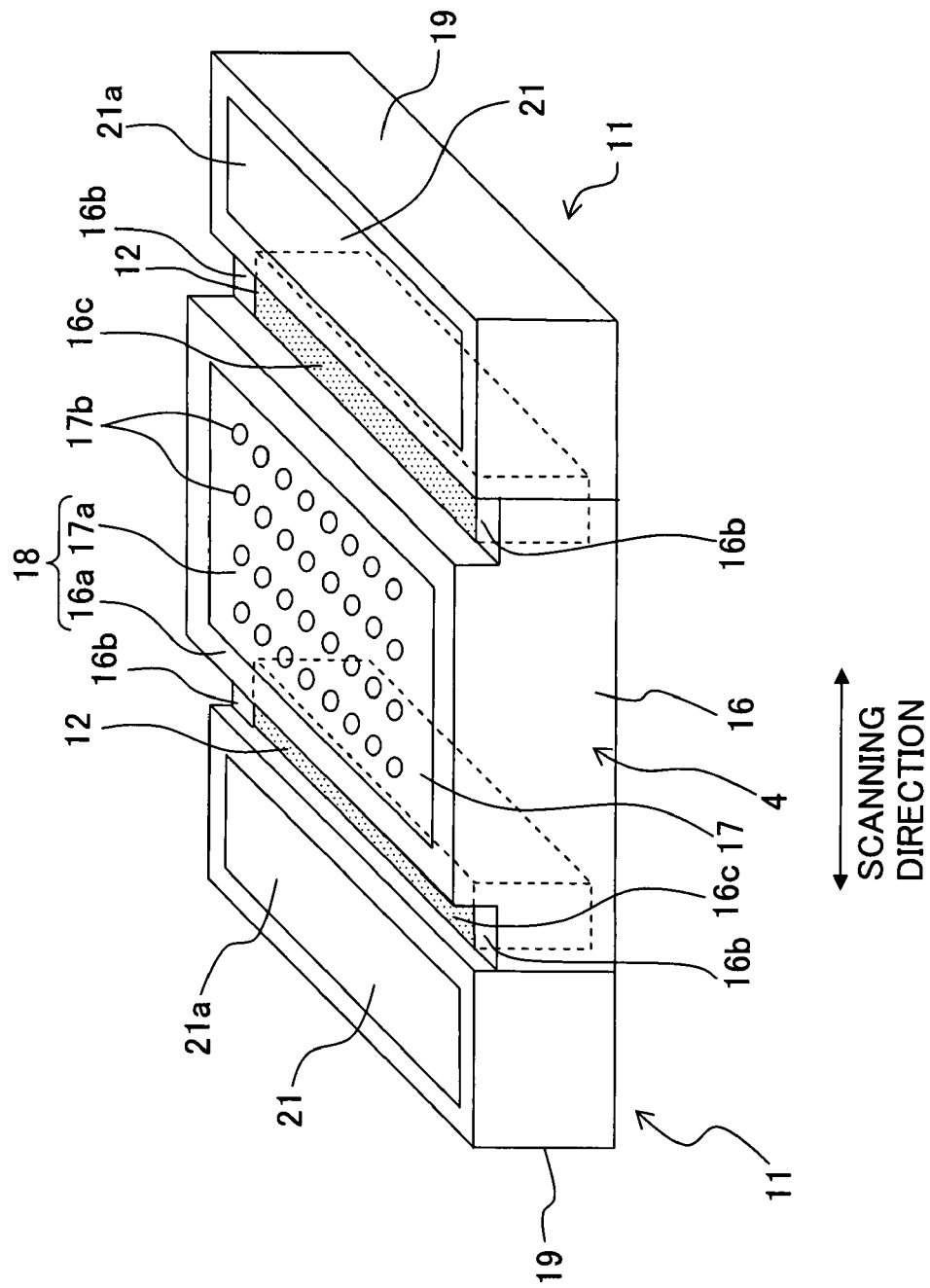
FIG. 2 shows a perspective view illustrating lower surfaces of main components of the printing apparatus shown in FIG. 1.

FIG. 2 shows a perspective view illustrating lower surfaces of main components of the printing apparatus 1 shown in FIG. 1. As shown in FIG. 2, the ink-jet head 4 has a housing 16. A main head body 17 is embedded in a lower portion of the housing 16 so that the main head body 17 is exposed downwardly. A large number of nozzle holes 17b, through which the UV-curable ink is discharged downwardly, are formed on the lower surface 17a of the main head body 17. The nozzle surface 18 is formed by the lower surface 17a of the main head body 17 and the lower surface 16a of the housing 16 which surrounds the lower surface 17a on the same plane.

A pair of walls 16b extend toward the UV light source unit 11 from the both ends in the paper feeding direction of each of the both side surfaces of the housing 16 in the scanning direction. Each of the walls 16b is provided above the nozzle surface 18 with respect to the recording medium 7, i.e., in the direction opposite to the discharge direction of the UV-curable ink. The ink-absorbing member 12 is accommodated in a recess 16c formed between the walls 16b facing to one another in the paper feeding direction. The UV light source units 11 are attached to the end surfaces of the walls 16b in the scanning direction. The ink-absorbing members 12 are interposed by the UV light source units 11 and the ink-jet head 4. In this way, the UV light source units 11 are arranged so that they are aligned in the scanning direction with respect to the ink-jet head 4. The UV light source units 11 irradiate the ultraviolet light downwardly.

FIG. 3 shows a front view illustrating main components of the printing apparatus 1 shown in FIG. 1. As shown in FIG. 3, each of the UV light source units 11 has a casing 19 which is open downwardly. A reflecting surface 19a is provided on the inner surface of the casing 19. A linear light emitter 20, which emits the ultraviolet light, is arranged in the space in the casing 19. The lower surface opening of the casing 19 is closed by a transparent cover 21 through which the ultraviolet light is transmissive. The light-outgoing surfaces 21a are formed by the lower surfaces of the transparent covers 21.

The nozzle surface 18 of the ink-jet head 4 is provided at the position at which the nozzle surface 18 is parallel to the light-outgoing surfaces 21a of the UV light source units 11 and the nozzle surface 18 protrudes by a distance L1 in the discharge direction of the UV-curable ink as compared with the light-outgoing surfaces 21a. That is, the light-outgoing surface 21a of the UV light source unit 11 is provided at the position at which the light-outgoing surface 21a is separated farther from the recording medium 7 by the distance L1 as compared with the nozzle surface 18 of the ink-jet head 4. The side wall 19b, which is a part of the casing 19 of the UV light source unit 11 and which is disposed on the side of the ink-absorbing member 12, protrudes by a distance L2 in the discharge direction of the UV-curable ink as compared with the ink-absorbing member 12. That is, the side wall 19b of the casing 19 of the UV light source unit 11 protrudes toward the recording medium 7 by the distance L2 as compared with the ink-absorbing member 12. The nozzle surface 18 of the ink-jet head 4 is provided at the position at which the nozzle surface 18 protrudes by a distance L1+L2 in the discharge direction of the UV-curable ink as compared with the ink-absorbing member. That is, the forward ends 12a of the ink-absorbing members 12, which are disposed on the side of the recording medium 7, are provided at the positions at which the forward ends 12a are separated farther from the recording medium 7 as compared with the nozzle surface 18 of the ink-jet head 4. The positions of the forward ends of the side walls 19b of the casings 19 in the ink discharge direction are the same as the positions of the light-outgoing surfaces 21a in the ink discharge direction.

Figure 4A:
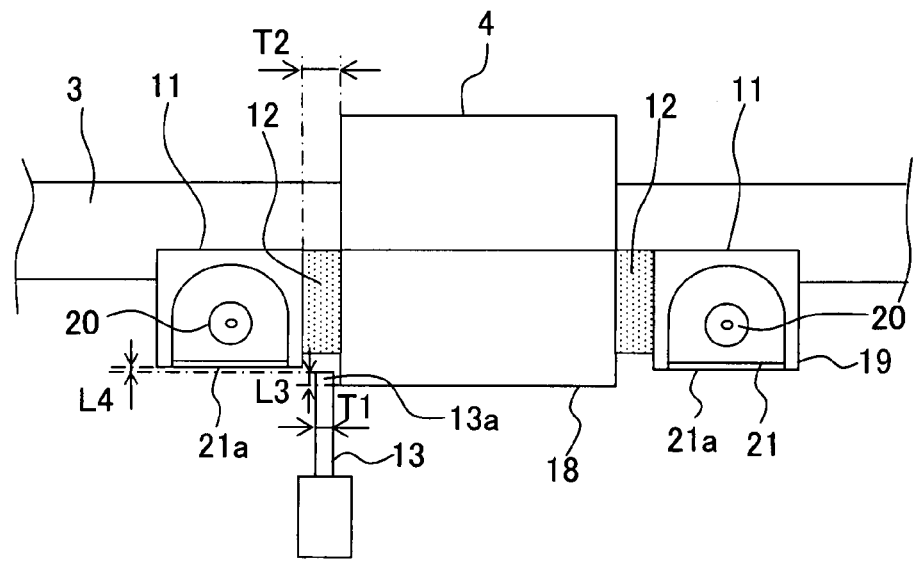
FIG. 4A shows a front view illustrating main components of the printing apparatus shown in FIG. 1 to depict a state in which the wiping is started.
Figure 4B:
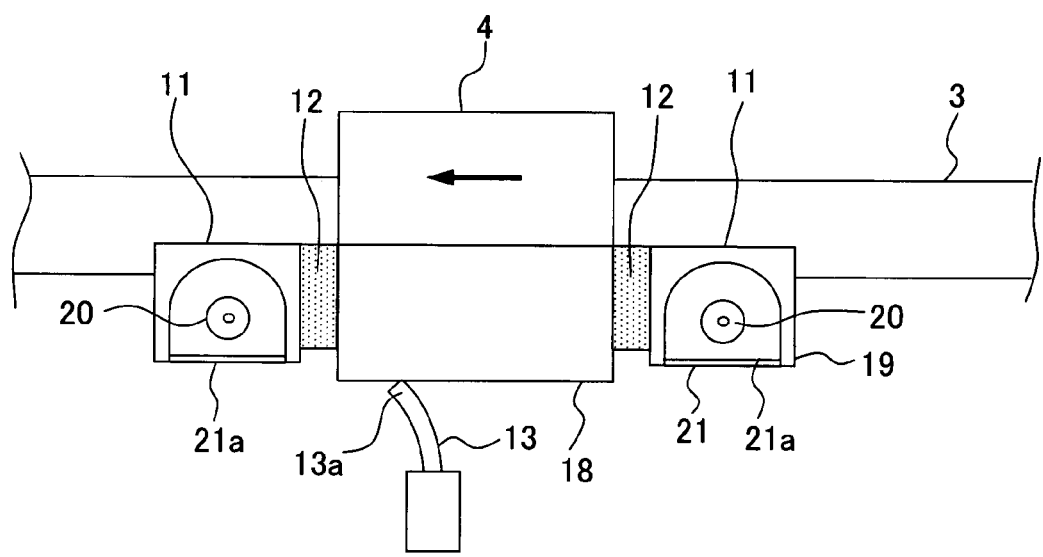
FIG. 4B shows a front view illustrating main component during the wiping.

FIG. 4A shows a front view illustrating main components of the printing apparatus 1 shown in FIG. 1 to depict a state in which the wiping is started, and FIG. 4B shows a front view illustrating main component during the wiping. As shown in FIG. 4A, the forward end 13a of the wiper 13 protrudes upwardly by a distance L3 as compared with the nozzle surface 18 of the ink-jet head 4, i.e., in the direction opposite to the discharge direction of the UV-curable ink. The wiper 13 wipes the nozzle surface 18 while making the flexible bending. However, the wiper 13 is arranged to form the gap of a distance L4 with respect to the UV light source unit 11 so that the wiper 13 makes no contact with the light-outgoing surface 21a of the UV light source unit 11 when the wiper 13 is positioned just under the UV light source unit 11. The thickness T1 of the wiper 13 is smaller than the thickness T2 of the ink-absorbing member 12.

As shown in FIG. 4B, when the ink-jet head 4 is moved so that the ink-jet head 4 passes over the wiper 13, the forward end 13a of the wiper 13 wipes the nozzle surface 18 of the ink-jet head 4 in the scanning direction. When the wiper 13 arrives at the end of the nozzle surface 18 in the scanning direction, then the UV-curable ink, which is collected by the wiping, is transported along the side surface of the ink-jet head 4, and the UV-curable ink is absorbed by the ink-absorbing member 12.

When the arrangement as described above is adopted, then the wiper 13 arrives at the end of the ink-jet head 4 while wiping the nozzle surface 18, and then the UV-curable ink, which is wiped by the wiper 13, is absorbed by the ink-absorbing member 12 disposed adjacently to the ink-jet head 4. Therefore, it is possible to prevent the light-outgoing surface 21a of the UV light source unit 11 from the adhesion of the UV-curable ink. Therefore, the ultraviolet light can be irradiated uniformly from the UV light source unit 11, and it is possible to improve the printing quality with the UV-curable ink.

The side wall 19b of the UV light source unit 11, which is disposed on the side of the ink-absorbing member 12, is provided at the position at which the side wall 19b protrudes in the discharge direction of the UV-curable ink as compared with the ink-absorbing member 12. Therefore, the ultraviolet light, which is irradiated from the light-outgoing surface 21a, is shielded by the side wall 19b. The ink-absorbing member 12 is prevented from being irradiated with the ultraviolet light. Owing to this fact, the UV-curable ink, which is absorbed by the ink-absorbing member 12, is prevented from being solidified. It is possible to suppress the deterioration of the ink-absorbing function of the ink-absorbing member 12.

Further, the nozzle surface 18 of the ink-jet head 4 is disposed at the position at which the nozzle surface 18 protrudes in the discharge direction of the UV-curable ink as compared with the light-outgoing surface 21a of the UV light source unit 11. Therefore, the gap of the distance L4 can be provided between the forward end 13a of the wiper 13 and the light-outgoing surface 21a of the UV light source unit 11. Owing to this fact, the wiper 13 makes no contact with the light-outgoing surface 21a of the UV light source unit 11. The UV-curable ink, which is wiped by the wiper 13, can be prevented from causing any adhesion to the light-outgoing surface 21a of the UV light source unit 11.

The nozzle surface 18 of the ink-jet head 4 is provided at the position at which the nozzle surface 18 protrudes in the discharge direction of the UV-curable ink as compared with the ink-absorbing member 12. Therefore, the wiping by the wiper 13 can be reliably performed from the end of the nozzle surface 18 in the scanning direction without being disturbed by the ink-absorbing member 12. The UV-curable ink, which is adhered to the entire nozzle surface 18, can be effectively removed.

Figure 6:
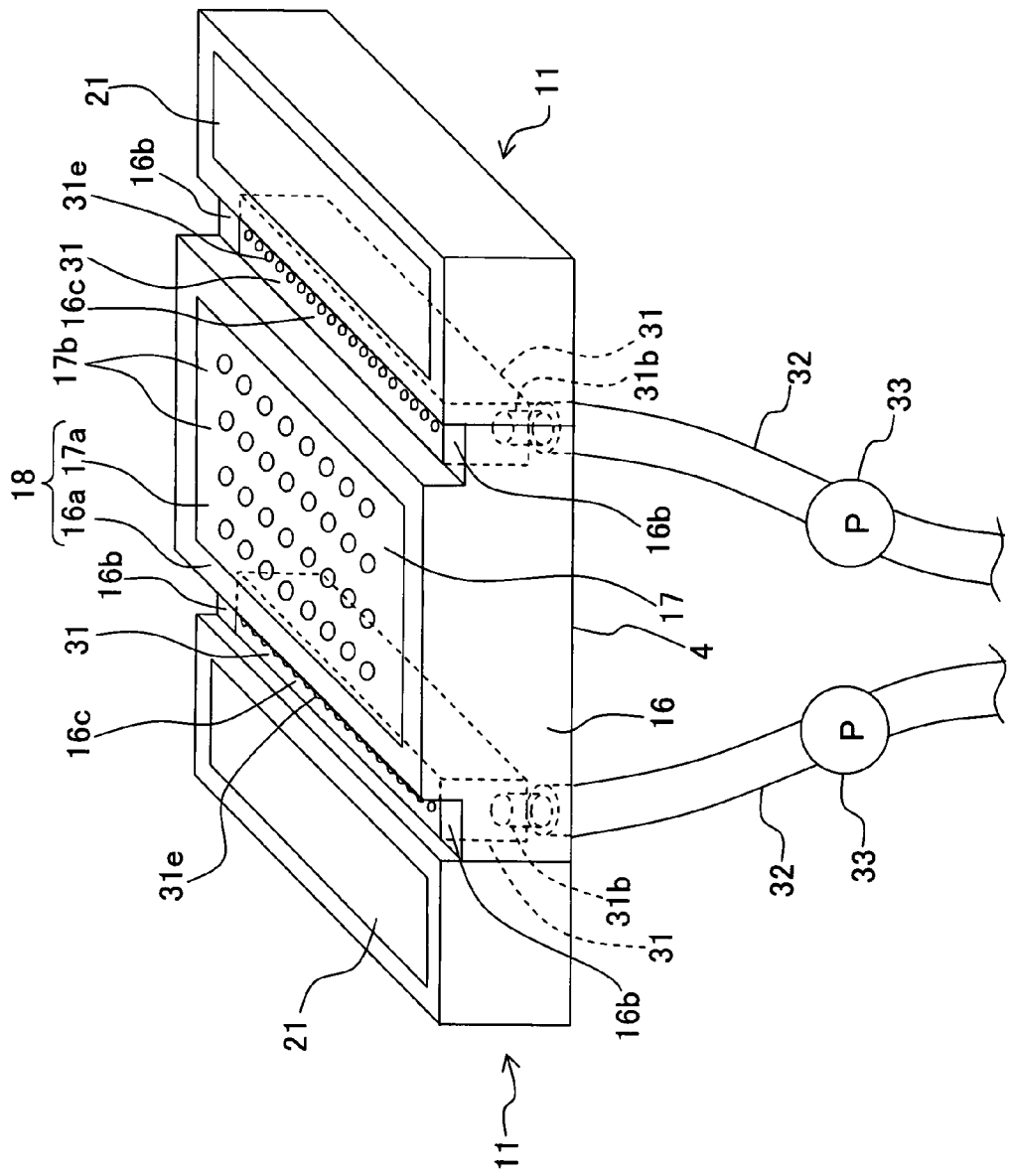
FIG. 6 shows a perspective view illustrating lower surfaces of main components of the printing apparatus shown in FIG. 5.
Figure 7:
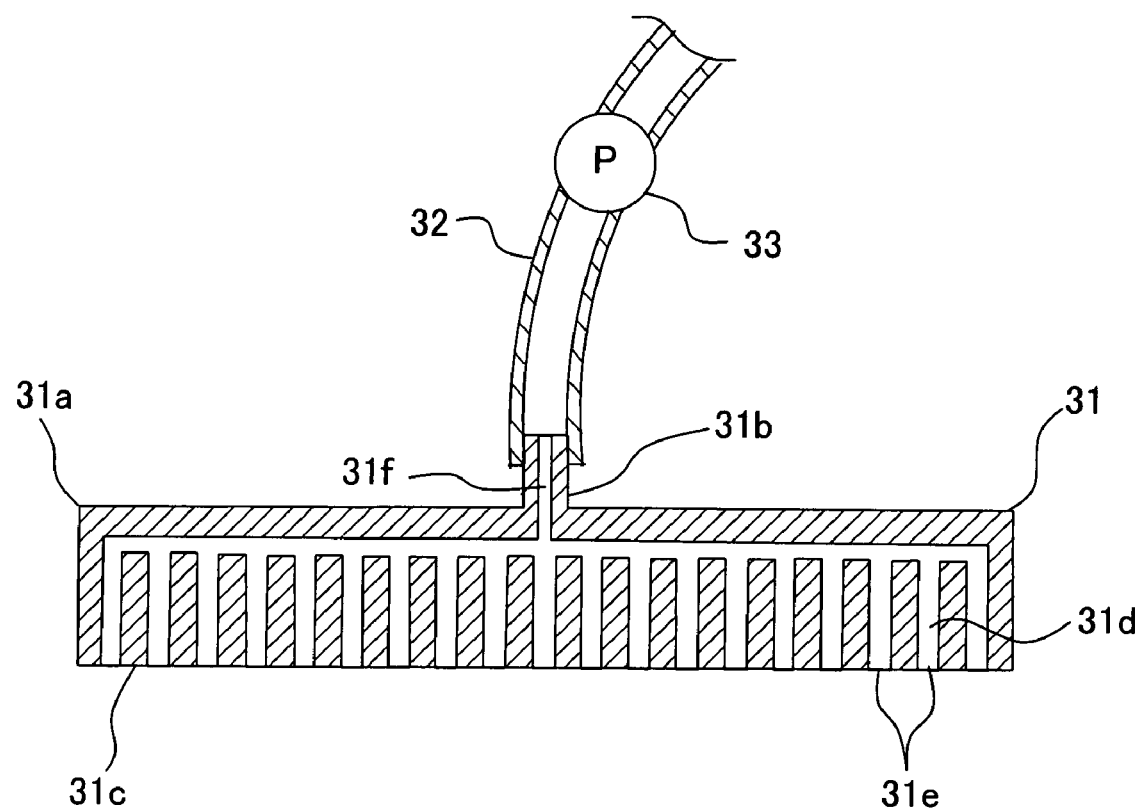
FIG. 7 shows a sectional view illustrating an ink-absorbing member of the printing apparatus shown in FIG. 5.

Next, a second embodiment of the present invention will be explained. FIG. 5 shows a front view illustrating main components of a printing apparatus according to the second embodiment of the present invention. FIG. 6 shows a perspective view illustrating lower surfaces of main components of the printing apparatus shown in FIG. 5. FIG. 7 shows a sectional view illustrating an ink-absorbing member 31 of the printing apparatus shown in FIGS. 5 and 6. As shown in FIG. 5, the printing apparatus of this embodiment has ink-absorbing members 31 each of which is made of resin (for example, polypropylene or ABS resin) and each of which is formed with a large number of minute ink flow passages 31d, the ink-absorbing members 31 being interposed between the ink-jet head 4 and the UV light source units 11. As shown in FIG. 6, the ink-absorbing members 31 are accommodated in recesses 16c disposed on the both side surfaces of the casing 16 of the ink-jet head 4.

As shown in FIG. 7, the ink-absorbing member 31 has a rectangular parallelepiped-shaped main body section 31a which is accommodated in the recess 16c of the casing 6 of the ink-jet head 4, and a suction connecting section 31b which protrudes upwardly from the upper surface of the main body section 31a. The main body section 31a is formed with the ink flow passages 31d which are communicated with a large number of absorption ports 31e that are open on the lower surface 31c thereof. The respective ink flow passages 31d are merged with each other at upper portions, and they are communicated with a suction flow passage 31f formed in the suction connecting section 31b. As shown in FIGS. 6 and 7, a suction tube 32, which is connected to a suction pump 33, is connected to the suction connecting section 31b of the ink-absorbing member 31.

According to the arrangement as described above, the UV-curable ink, which is wiped by the wiper 13 after the wiper 13 wipes the nozzle surface 18 to arrive at the end of the ink-jet head 4 in the scanning direction, is absorbed from the absorption ports 31e to the ink flow passages 31d of the ink-absorbing member 31 by the capillary phenomenon. The ink contained in the ink flow passages 31d is periodically sucked by the suction pump 33, and the ink is discharged to a discharge tank (not shown). Accordingly, the light-outgoing surface 21a of the UV light source unit 11 is prevented from the adhesion of the UV-curable ink. It is possible to improve the printing quality with the UV-curable ink. Those other than the above are constructed in the same manner as in the first embodiment, any explanation of which is omitted.

Figure 8:
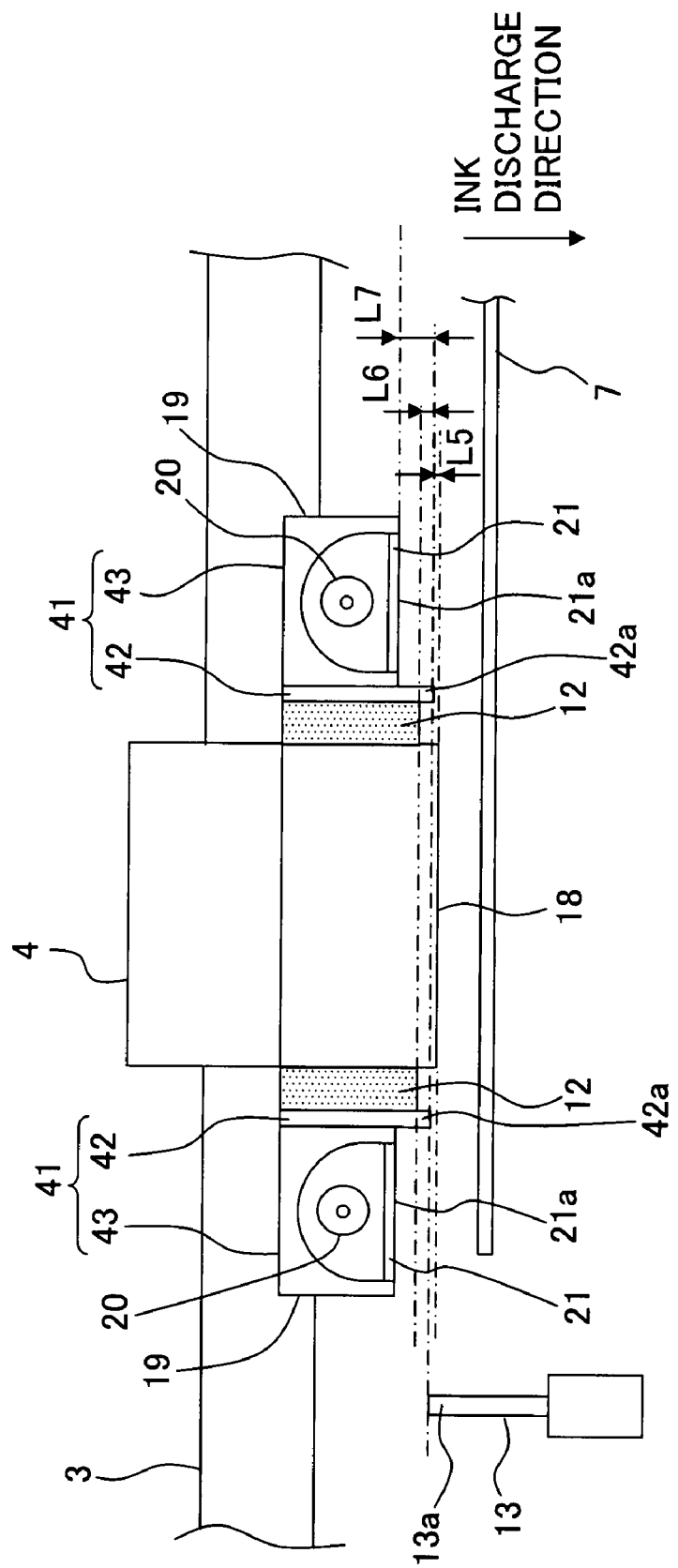
FIG. 8 shows a front view illustrating main components of a printing apparatus according to a third embodiment of the present invention.

Next, a third embodiment of the present invention will be explained. FIG. 8 shows a front view illustrating main components of a printing apparatus according to the third embodiment of the present invention. As shown in FIG. 8, each of UV light source units 41 of this embodiment has a main UV light source body 43 and a light shielding plate 42. The main UV light source body 43 has a housing 19 which is open downwardly. A reflecting surface 19*a* is provided in the housing 19. A linear light emitter 20, which emits the ultraviolet light, is arranged in the space in the housing 19. The lower surface opening of the housing 19 is closed by a transparent cover 21 through which the ultraviolet light is transmissive. A light-outgoing surface 21*a* is formed by the lower surface of the transparent cover 21.

The light shielding plates 42 are attached to the side surfaces of the casing 19 of the main UV light source body 43 disposed on the sides of the ink-absorbing members 12. The nozzle surface 18 of the ink-jet head 4 is provided at the position at which the nozzle surface 18 protrudes by a distance L5 in the discharge direction of the UV-curable ink as compared with the light shielding plates 42. That is, the light shielding plate 42 is provided at the position at which the light shielding plate 42 is separated farther from the recording medium 7 by the distance L5 as compared with the nozzle surface 18. The light shielding plate 42 protrudes by a distance L6 in the discharge direction of the UV-curable ink as compared with the ink-absorbing member 12. That is, the light shielding plate 42 protrudes by the distance L6 toward the recording medium 7 as compared with the ink-absorbing member 12. Further, the light shielding plate 42 protrudes by a distance L7 in the discharge direction of the UV-curable ink as compared with the light-outgoing surface 21*a* of the UV light source unit 41. That is, the light-outgoing surface 21*a* is provided at the position at which the light-outgoing surface 21*a* is separated farther from the recording medium 7 by the distance L7 as compared with the forward end 42*a* of the light shielding plate 42 disposed on the side of the recording medium 7. The forward end 42*a* of the light shielding plate 42, which is disposed on the side of the recording medium 7, is arranged so that the forward end 42*a* of the light shielding plate 42 has the same height as that of the forward end 13*a* of the wiper 13, or the forward end 42*a* of the light shielding plate 42 slightly protrudes in the discharge direction of the UV-curable ink. When the light shielding plate 42 makes the transverse movement over the wiper 13 in the scanning direction, they make contact with each other.

According to the arrangement as described above, the ultraviolet light coming from the main UV light source body 43 is reliably shielded by the light shielding plate 42, and hence the ink-absorbing member 12 is prevented from being irradiated with the ultraviolet light. Therefore, the light-outgoing surface 21*a* of the main UV light source body 43 can be also arranged while being separated from the recording medium 7. It is possible to widen the ultraviolet light irradiation range. Further, the forward end 13*a* of the wiper 13 makes contact with the forward end 42*a* of the light shielding plate 42 disposed on the side of the recording medium 7. Therefore, the wiper 13 wipes the nozzle surface 18 to arrive at the end of the ink-jet head 4, and then the UV-curable ink, which remains at the forward end 13*a* of the wiper 13, is removed by the contact with the light shielding plate 42. Therefore, the light-outgoing surface 21*a* of the UV light source unit 11 can be appropriately prevented from the adhesion of the UV-curable ink. Further, the light shielding plate 42 is provided as the member which is distinct from the casing 19. Therefore, the arrangement of the light shielding plate 42 can be changed irrelevant to the position of the light-outgoing surface 21*a* of the UV light source unit 41. It is easy to adjust the light shielding range. Those other than the above are constructed in the same manner as in the first embodiment, any explanation of which is omitted. In the third embodiment, the forward end 42*a* of the light shielding plate 42 is provided to make contact with the forward end 13*a* of the wiper 13. However, it is also allowable to adopt an arrangement in which they make no contact with each other.

Figure 9:
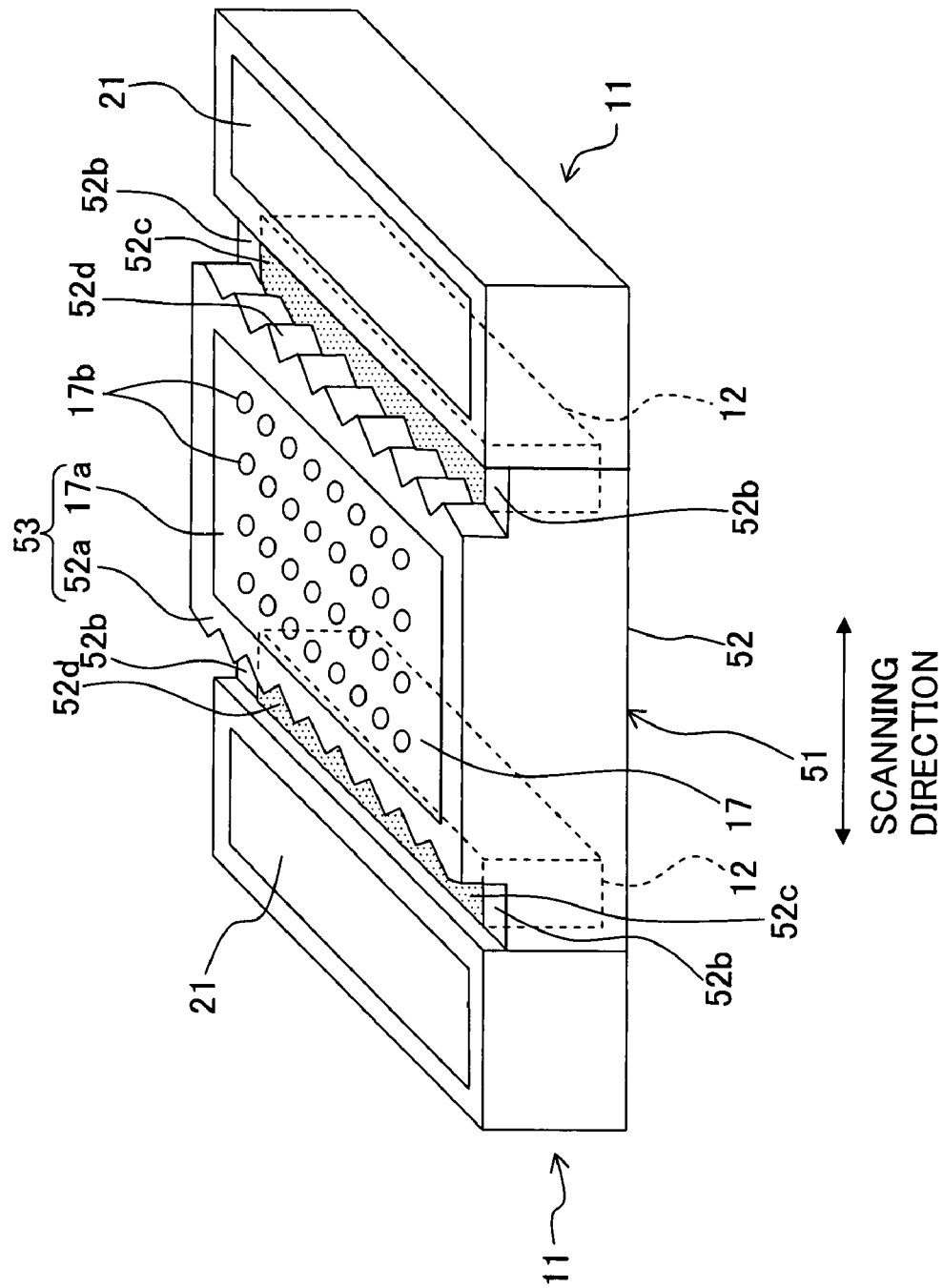
FIG. 9 shows a perspective view illustrating lower surfaces of main components of a printing apparatus according to a fourth embodiment of the present invention.

Next, a fourth embodiment of the present invention will be explained. FIG. 9 shows a perspective view illustrating lower surfaces of main components of a printing apparatus according to the fourth embodiment of the present invention. As shown in FIG. 9, the printing apparatus of this embodiment has projections and recesses which are formed on both side surfaces of an ink-jet head 51 disposed on the sides of ink-absorbing members 12.

In particular, the ink-jet head 51 has a casing 52. A main head body 17 is embedded in a lower portion of the casing 52 so that the main head body 17 is exposed downwardly. A nozzle surface 53 is formed by a lower surface 17*a* of the main head body 17 on which nozzle holes 17*b* are formed and a lower surface 52*a* of the casing 52 which surrounds the lower surface 17*a* on the same plane. A pair of walls 52*b* protrude toward the UV light source unit 11 from the both ends in the paper feeding direction of each of the both side surfaces of the casing 52 in the scanning direction. Each of the walls 52*b* is provided above the nozzle surface 53 with respect to the recording medium 7, i.e., in the direction opposite to the discharge direction of the UV-curable ink. The ink-absorbing members 12 are accommodated in recesses 52*c* which are formed between the walls 52*b* facing to one another in the paper feeding direction. A large number of guide grooves 52*d*, which extend in the vertical direction from the ends of the nozzle surface 52 in the scanning direction to the ink-absorbing members 12, are formed to have sawtooth-shaped cross sections on the both side surfaces of the casing 52 in the scanning direction.

According to the arrangement as described above, the guide grooves 52*d* are provided on the both side surfaces of the ink-jet head 51 disposed on the sides of the ink-absorbing members 12. Therefore, when the wiper 13 (see FIG. 4) performs the wiping for the nozzle surface 53 of the ink-jet head 51 to arrive at the end of the nozzle surface 53 in the scanning direction, the liquid drops of the UV-curable ink adhered to the forward end 13*a* of the wiper 13 make contact with the guide grooves 52*d* disposed on the side surface of the ink-jet head 51. In this situation, the UV-curable ink is spread by the surface tension so that the UV-curable ink is guided to the ink-absorbing member 12 along the guide grooves 52*d* of the ink-jet head 51. Therefore, the liquid drops of the UV-curable ink wiped by the wiper 13 are prevented from growing and falling. The UV-curable ink can be absorbed quickly and reliably by the ink-absorbing member 12 along the guide grooves 52*d* of the ink-jet head 51. Those other than the above are constructed in the same manner as in the first embodiment, any explanation of which is omitted.

Figure 10:
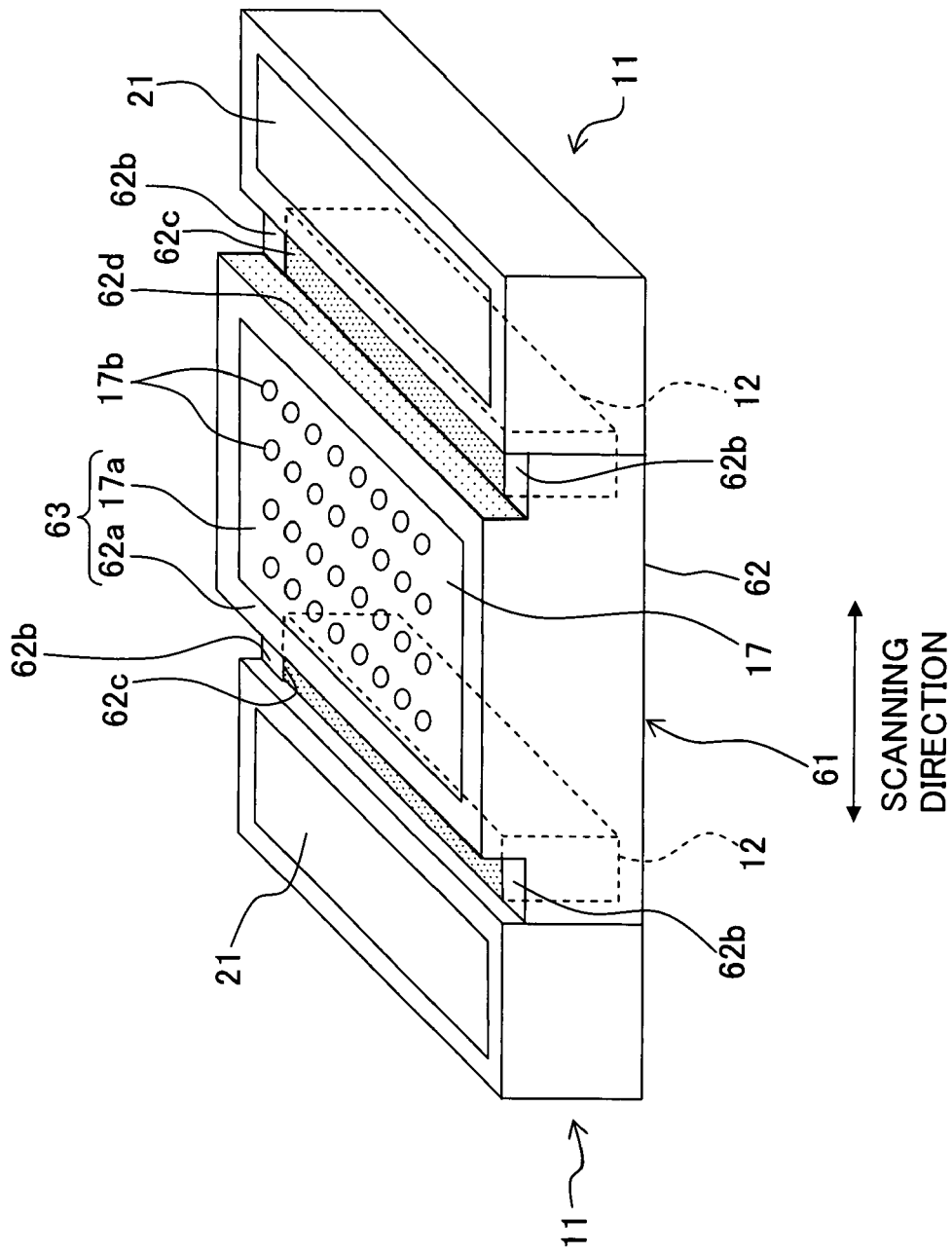
FIG. 10 shows a perspective view illustrating lower surfaces of main components of a printing apparatus according to a fifth embodiment of the present invention.

Next, a fifth embodiment of the present invention will be explained. FIG. 10 shows a perspective view illustrating lower surfaces of main components of a printing apparatus according to the fifth embodiment of the present invention. As shown in FIG. 10, in the printing apparatus of this embodiment, fine unevennesses or projections and recesses are formed on both side surfaces 62d of an ink-jet head 61 disposed on the sides of the ink-absorbing members 12.

In particular, the ink-jet head 61 has a casing 62. A main head body 17 is embedded in a lower portion of the casing 62 so that the main head body 17 is exposed downwardly. A nozzle surface 63 is formed by a lower surface 17a of the main head body 17 on which nozzle holes 17b are formed and a lower surface 62a of the casing 62 which surrounds the lower surface 17a on the same plane. A pair of walls 62b protrude toward the UV light source unit 11 from the both ends in the paper feeding direction of each of the both side surfaces of the casing 62 in the scanning direction. Each of the walls 62b is provided above the nozzle surface 63 with respect to the recording medium 7, i.e., in the direction opposite to the discharge direction of the UV-curable ink. The ink-absorbing members 12 are accommodated in recesses 62c which are formed between the walls 62b facing to one another in the paper feeding direction. The fine unevennesses are formed in a rough surface form in areas ranging from the ends of the nozzle surface 63 in the scanning direction to the ink-absorbing members 12 on the both side surfaces 62d of the casing 62 in the scanning direction.

According to the arrangement as described above, the liquid drops of the UV-curable ink, which arrive at the end of the nozzle surface 63 by the wiping, are spread by means of the surface tension, when the liquid drops make contact with the unevennesses of the side surface 62d of the ink-jet head 61. Therefore, the UV-curable ink, which is wiped, is easily absorbed by the ink-absorbing member 12 along the side surface 62d of the ink-jet head 61. Those other than the above are constructed in the same manner as in the first embodiment, any explanation of which is omitted. In place of the rough surface form of the side surface 62d of the ink-jet head 61, it is also allowable to provide fine unevennesses or projections and recesses in a wrinkle form.

It is not necessarily indispensable that the UV light source unit has the reflecting surface 19a and the transparent cover 21. It is also allowable to adopt such a form that UV-LED is arranged in a casing. In this case, the forward end of UV-LED corresponds to the light-outgoing surface.

In the respective embodiments described above, the two UV light source units 11 are provided on the both sides in the scanning direction of the ink-jet head 4. However, it is also allowable that the UV light source unit 11 is provided on only any one of the sides in the scanning direction. The UV light source unit may be provided on only the upstream side in the paper feeding direction of the ink-jet head 4, and the ink-receiving section may be provided between the UV light source unit and the ink-jet head 4. In this arrangement, the wiper may be provided as follows. That is, the wiper waits outside the printing area, and the wiper wipes the nozzle surface toward the upstream in the paper feeding direction when the ink-jet head 4 is moved to the outside of the printing area. Even in such an arrangement, the same effect as those of the respective embodiments described above can be obtained by making the arrangement so that the nozzle surface, the light-outgoing surface, the forward end of the wiper, and the ink-receiving section have the same positional relationship in the ink discharge direction as those of the respective embodiments described above.

In the embodiments described above, the ink-absorbing member, which serves as the ink-receiving section, is provided between the ink-jet head and the UV light source unit. However, a simple groove may be formed as the ink-receiving section. In this arrangement, the side wall of the UV light source unit extends in the discharge direction of the UV-curable ink to form a part of the groove, and thus the ultraviolet light is shielded by the side wall. Therefore, the UV-curable ink pooled in the groove can be prevented from being solidified or cured.

The foregoing description is illustrative of the exemplary case in which the present invention is applied to the printing apparatus for performing the printing by discharging the UV-curable ink onto the recording medium. However, the applicable form of the present invention is not limited thereto. The present invention is also applicable to any apparatus to be used in a variety of fields including, for example, those of the medical treatment and the analysis without being limited to the printing apparatus provided that the apparatus is provided with the head for discharging liquid droplets and the light source for irradiating the light onto the discharged liquid droplets in order to cure the liquid droplets.

What is claimed is:

1. A printing apparatus which performs printing with a UV-curable ink curable by ultraviolet light, the printing apparatus comprising:
    an ink-jet head which has a nozzle surface on which a plurality of nozzle holes are open, the nozzle holes discharging the UV-curable ink toward a recording medium;
    a UV light source unit which is provided integrally with the ink-jet head and which irradiates the ultraviolet light toward the recording medium;
    a wiper which wipes the nozzle surface of the ink-jet head; and
    an ink-absorbing member which is provided integrally with the ink-jet head, and is located between the ink-jet head and the UV light source unit.

2. The printing apparatus according to claim 1;
    wherein at least a side wall, of the UV light source unit, on a side of the ink-absorbing member, protrudes in a discharge direction of the UV-curable ink more than the ink-absorbing member.

3. The printing apparatus according to claim 2;
    wherein the side wall is a part of a casing of the UV light source unit.

4. The printing apparatus according to claim 2;
    wherein the side wall is a light shielding plate which is provided as a separate member from a casing of the UV light source unit.

5. The printing apparatus according to claim 2;
    wherein the side wall protrudes in the discharge direction of the UV-curable ink more than a light-outgoing surface of the UV light source unit.

6. The printing apparatus according to claim 1;
    wherein the nozzle surface of the ink-jet head protrudes in a discharge direction of the UV-curable ink more than a light-outgoing surface of the UV light source unit.

7. The printing apparatus according to claim 1;
    wherein the nozzle surface of the ink-jet head protrudes in a discharge direction of the UV-curable ink more than the ink-absorbing member.

8. The printing apparatus according to claim 7;
    wherein a projection and a recess are formed in an area on a side surface, of the ink-jet head, on a side of the ink-absorbing member, the area ranging from the nozzle surface to the ink-absorbing member.

9. The printing apparatus according to claim 8;
    wherein the projection and recess are defined by guide groove formed on the side surface, the groove ranging from the nozzle surface to the ink-absorbing member.

10. The printing apparatus according to claim 8;
    wherein the projection and recess are formed to have a rough surface shape or in a wrinkle shape.

11. A printing apparatus which performs printing with a UV-curable ink curable by ultraviolet light, the printing apparatus comprising:
- an ink-jet head which has a nozzle surface on which a plurality of nozzle holes are formed, the nozzle holes discharging the UV-curable ink toward a recording medium;
- a UV light source unit which has a light-outgoing surface via which the ultraviolet light is irradiated toward the recording medium and which is provided integrally with the ink-jet head;
- a wiper which wipes the nozzle surface by moving relative to the ink-jet head; and
- an ink-receiving section which is formed integrally with the ink-jet head, and is located between the ink-jet head and the UV light source unit, and which receives the ink wiped by the wiper;
- wherein the light-outgoing surface is positioned to bring the wiper into contact with the nozzle surface and to prevent from making contact with the light-outgoing surface when the ink-jet head moves relative to the wiper.

12. The printing apparatus according to claim 11;
wherein the ink-receiving section is formed of an ink-absorbing member.

13. The printing apparatus according to claim 12;
wherein the light-outgoing surface protrudes more than the ink-absorbing member in a discharge direction of the UV-curable ink.

14. The printing apparatus according to claim 12;
wherein the UV light source unit has a side wall, on a side of the ink-absorbing member, the side wall extending in a discharge direction of the UV-curable ink; and
wherein a forward end of the side wall protrudes more than the ink-absorbing member in the discharge direction of the UV-curable ink.

15. The printing apparatus according to claim 11;
wherein the ink-receiving section is a groove.

16. The printing apparatus according to claim 15;
wherein the UV light source unit has a side wall which extends in a discharge direction of the UV-curable ink and which forms a part of the groove.

* * * * *